Dec. 19 1922.

J. W. BROWN.
UNISTRAND CONVEYING ELEVATOR.
FILED JUNE 22, 1920.

Inventor
James W. Brown.

By John S. Barker
Attorney

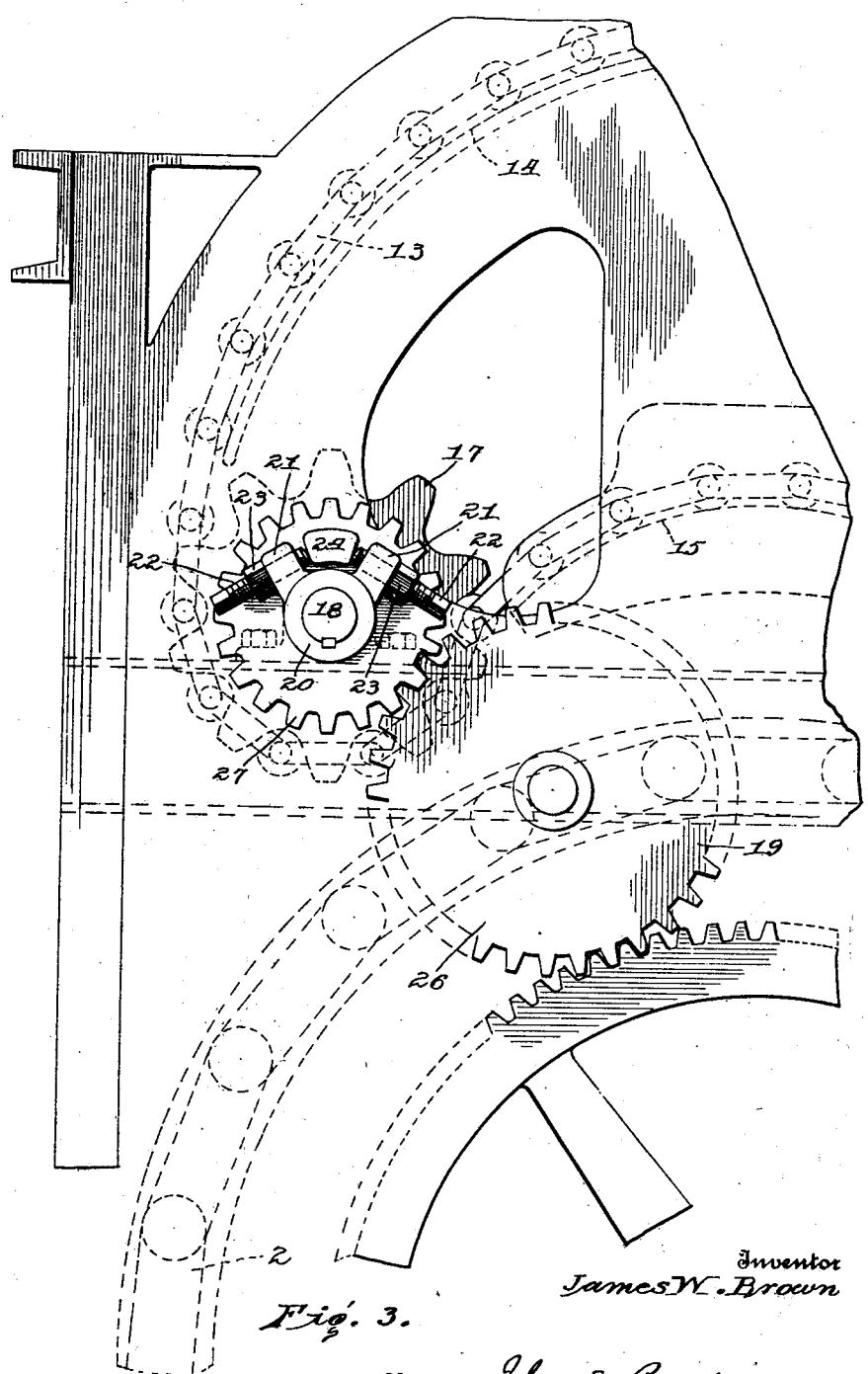

Patented Dec. 19, 1922.

1,439,141

UNITED STATES PATENT OFFICE.

JAMES W. BROWN, OF MILWAUKEE, WISCONSIN, ASSIGNOR TO CHAIN BELT COMPANY, OF MILWAUKEE, WISCONSIN, A CORPORATION OF WISCONSIN.

UNISTRAND CONVEYING ELEVATOR.

Application filed June 22, 1920. Serial No. 390,752.

*To all whom it may concern:*

Be it known that I, JAMES W. BROWN, a citizen of the United States, residing at Milwaukee, in the county of Milwaukee and State of Wisconsin, have invented certain new and useful Improvements in Unistrand Conveying Elevators, of which the following is a specification.

My invention relates to what are known as unistrand elevating conveyors such as illustrated in Patent 896,029 of August 11, 1908, to C. W. Levalley. These elevators are usually employed for transferring packages from one floor to another and consists essentially of a single endless strand of a power transmitting belt, usually of sprocket chain, to which are pivotally attached the carriers, which move in a plane to one side of the plane in which the belt travels.

In the drawings in which my invention is illustrated—

Fig. 3 is an enlarged detail view in side elevation showing the adjustable sprocket wheel and the means associated therewith for adjusting it.

Figure 1:
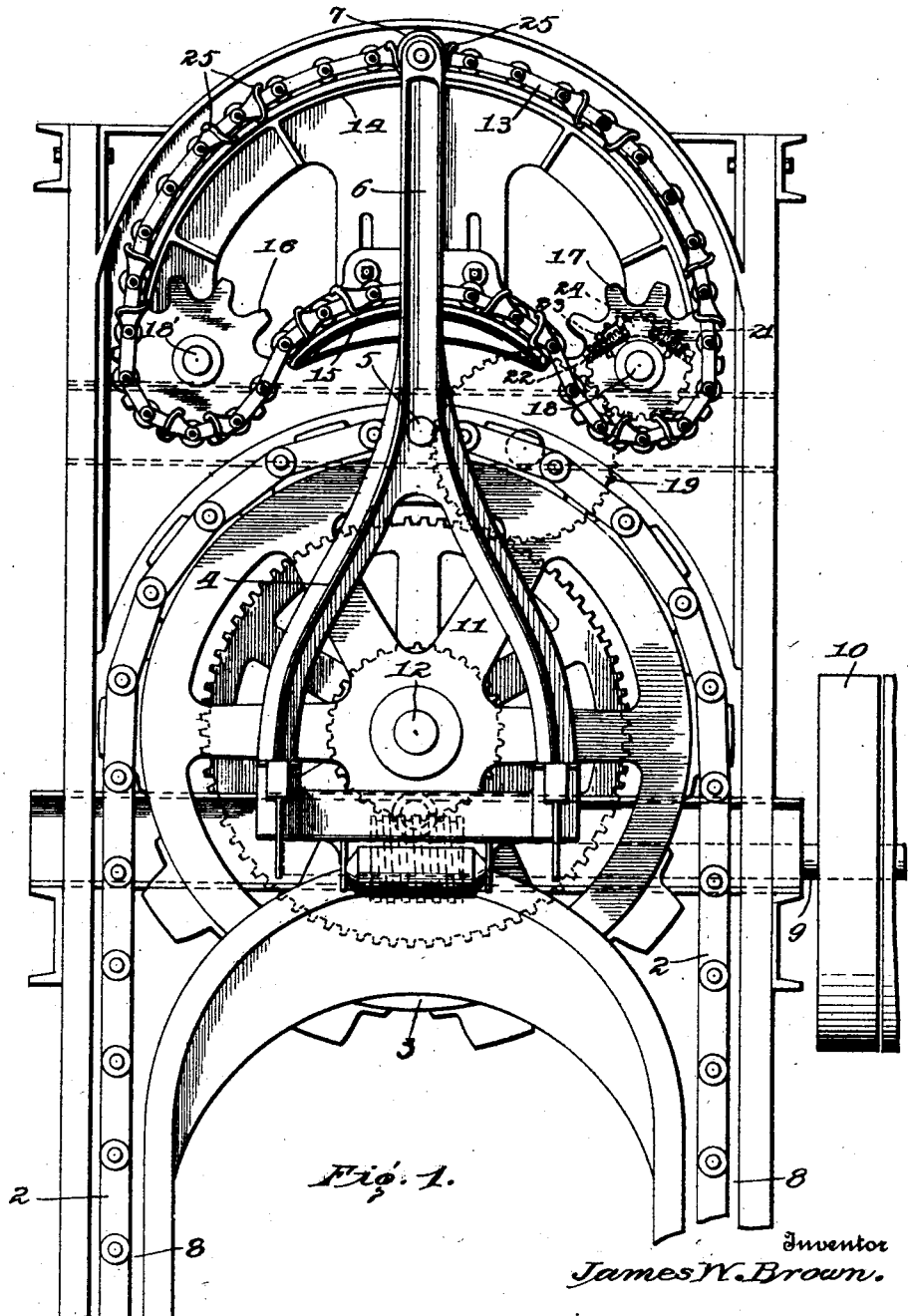
Figure 1 is a front elevation of the head end of a conveying elevator to which the invention is applied.
Figure 2:
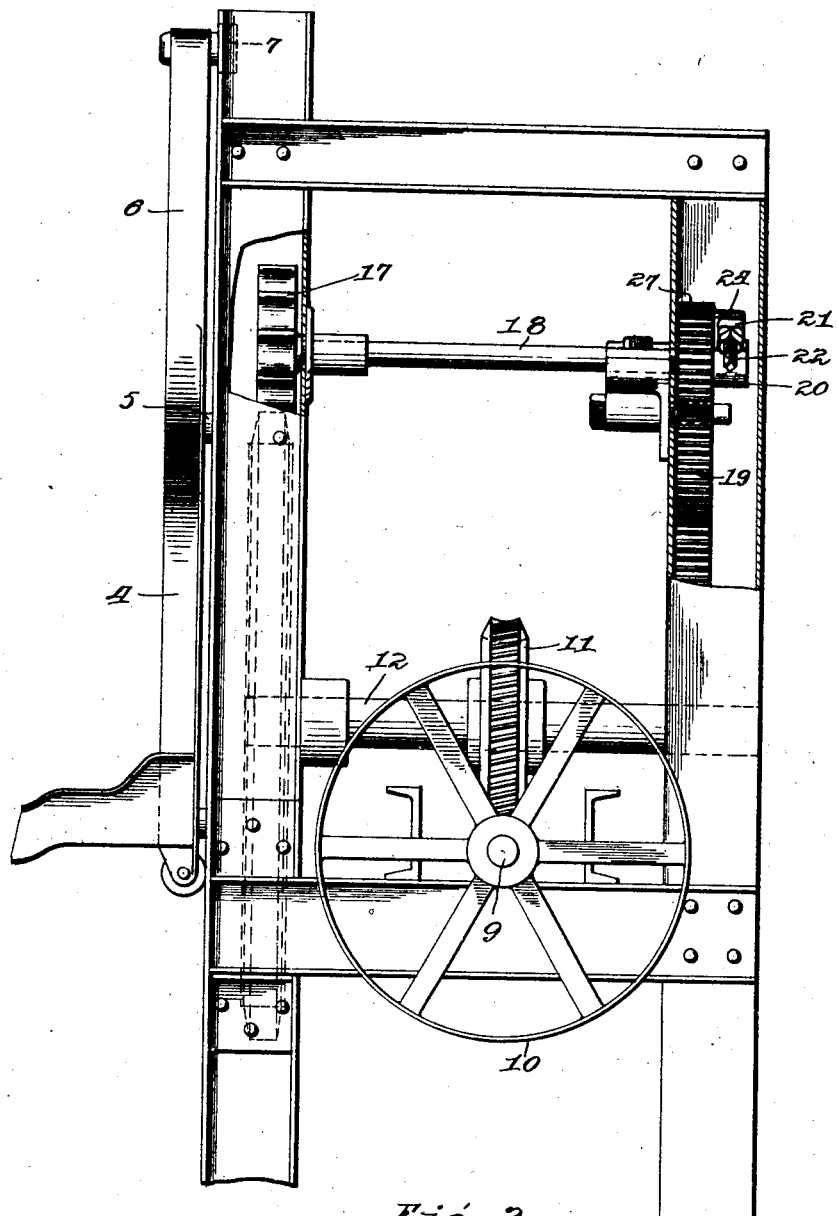
Fig. 2 is a side elevation of the same.

In the drawings 2 indicates a sprocket chain, constituting the endless power belt of the conveyor, supported by suitable head and foot wheels, only the former, designated 3, being shown, since the present invention relates entirely to the construction of the upper part of the elevator. Secured to the chain 2 by pivots 5 are carriers or supports 4 for the articles to be transported by the conveyor. These are supported so as to swing freely upon their pivots in order that they shall maintain upright positions as they pass the head and foot wheels, as is common in this type of conveyor. The frame of each carrier extends upwardly beyond its pivot to form a steadying arm 6 at the upper end of which is a projection or roller 7. This roller runs in vertical guideways 8, 8, that parallel the vertical courses of the chain 2, and by which the carriers are steadied in their upward and downward movements. When a carrier reaches the upper end of the conveyor and passes from the upmoving leg of the elevator to the down-moving one, passing the head wheel in so doing, it is found necessary to provide means for steadying it and assisting it in making the crossover, and for this purpose I use the endless guiding and steadying chain 13.

9 indicates the main power shaft, suitably supported in the framework of the conveyor near the head wheel. Upon it are mounted the fast and loose pulleys 10 with which the power-transmitting belt engages. Worm gearing 11 unites the power shaft 9 with another shaft 12, at right angles thereto, which carries the head wheel 3. The transfer or crossover chain 13 is so guided that the upper crossover thereof is concentric with the chain 2 as it passes around the head wheel 3. To secure this there is provided a guide 14 with which the said upper run engages, while the lower or return run engages with a guide 15. This chain is supported on sprocket wheels 16, 17, mounted respectively on shafts 18', 18. One of these shafts, 18, is driven, through gearing 19, from the shaft 12. Certain of the links of the guiding crossover chain 13 are formed with wings 25, so shaped that a pair of them constitute a seat for the roller 7 at the upper end of a steadying arm 6.

The parts thus far described are similar to features illustrated and described in the aforesaid Patent 896,029.

In operating an elevating conveyor of the kind shown it is found that a very nice fit between the rollers 7 and the seats formed therefor by the wings 25 of the steadying crossover chain is necessary, or else the carriers are not held steadily and in proper vertical position while making the transfer from the upmoving to the downmoving run. As is apparent from the drawings the gears employed to drive the moving parts of the elevator, including the crossover guiding devices, are necessarily of fairly heavy pitch, which makes it difficult to secure the nice adjustment of parts required for the smooth and most satisfactory running of the conveyor. It is the object of the present invention to provide means for adjusting the steadying crossover means, relative to the main belt 2 of the elevator, to permit of the fine adjustment of the driving gearing for the crossover in order to insure that whenever a carrier approaches the head wheel, one of the roller seats in the steadying crossover belt will be in exactly the proper position to receive a roller 7 and to move forward with it as the carrier passes from one run of the conveyor across the head wheel and to the other run. To permit this adjustment I have devised the following: 20 indicates a hub secured fast to the shaft 18. The spur wheel 27, constituting one of the train of gearing 19 through which the shaft 18 is driven, is mounted loosely upon the latter alongside the hub 20. The latter is provided with a pair of arms 21, 21, spaced apart sufficiently far to receive between them a lug 24 carried by the spur wheel 27 and projecting laterally from the face thereof. The adjusting screws 22 are seated in the arms 21 and are adapted to have their ends bear against opposite faces of the lug 24. Lock nuts 23 mounted upon the adjusting screws serve to hold the latter securely after they have been adjusted to properly set the wheel 27. By advancing one of the screws 22 and retracting the other, the shaft 18, and with it the sprocket wheel 17 and the chain of the crossover guide 13, may be given that nice adjustment that is necessary to cause smooth running of the apparatus. It will be understood that an approximate adjustment of the crossover guide with reference to the driving belt of the conveyor may be effected by turning the spur gear 27 with reference to the wheel 26 with which it meshes, but this is not sufficient, and therefore I provide the means that have been described for effecting a further and more delicate adjustment.

What I claim is:

1. In a unistrand elevating conveyor, the combination with a single endless belt, carriers pivotally connected therewith so as to be free to swing to one side of the plane of movement of the endless belt, and a movable guide for steadying the carriers as they cross over from one run of the conveyor to the other, of means for adjusting the movable guide relative to the conveyor belt whereby it may be brought into position to cause accurate registry between it and the carriers which it is to steady.

2. In a unistrand elevating conveyor, the combination with a single power transmitting belt, carriers pivoted thereto and an endless steadying belt for the carriers as they pass from one run of the conveyor to the other, of means for adjusting the run of the steadying crossover belt that coacts with the carriers relative to the belt of the conveyor to insure accurate registry between the steadying belt and the carriers, and means for positively driving the steadying belt so it moves in synchronism with the main conveying belt.

3. In a unistrand elevating conveyor, the combination with a single power transmitting belt, and carriers pivoted thereto, of an endless steadying belt for the carriers as they pass from one run of the conveyor to the other, wheels with which the steadying belt engages, drive gearing for the steadying belt including a wheel loose upon the shaft of one of the wheels for the steadying belt, and means for adjusting the said loose wheel upon its shaft and securing it after adjustment, whereby the run of the steadying belt that coacts with the carriers may be brought to position relative to the conveyor belt to accurately engage with the carriers as they successively come to position to cross over from one run to the other.

4. In a unistrand elevating conveyor, the combination with an endless belt, and carriers pivotally connected therewith so as to be free to swing to one side of the plane of movement of the endless belt, the carriers being provided with steadying arms, of an endless steadying crossover belt with which the arms of the carriers engage as the carriers are moved across the conveyor from one run thereof to the other, wheels for supporting the steadying crossover belt, gearing for turning the wheels of the crossover belt to move the latter, including a gear wheel loose on the shaft of one of said wheels and provided with a lug, a hub secured fast to the said shaft and arranged alongside of the said loose gear wheel, the hub being formed with arms between which lies the lug carried by the gear wheel, and adjusting screws mounted in the arms of the hub adapted to bear upon the said lug from opposite sides, whereby the crossover belt may be adjusted, relative to the belt of the conveyor, to insure accurate registry between the steadying arms of the carriers and the crossover belt.

JAMES W. BROWN.